(12) United States Patent
Alex et al.

(10) Patent No.: US 11,080,621 B2
(45) Date of Patent: Aug. 3, 2021

(54) MACHINE LEARNING-BASED READ CHANNEL DATA DETECTION

(71) Applicant: Western Digital Technologies, Inc., San Jose, CA (US)

(72) Inventors: Michael Alex, San Jose, CA (US); Xinzhi Xing, San Jose, CA (US)

(73) Assignee: Western Digital Technologies, Inc., San Jose, CA (US)

(*) Notice: Subject to any disclaimer, the term of this patent is extended or adjusted under 35 U.S.C. 154(b) by 602 days.

(21) Appl. No.: 16/010,516

(22) Filed: Jun. 18, 2018

(65) Prior Publication Data

US 2019/0385094 A1    Dec. 19, 2019

(51) Int. Cl.

| | |
|---|---|
| *G11B 5/09* | (2006.01) |
| *G06N 20/00* | (2019.01) |
| *G11B 20/10* | (2006.01) |
| *G06F 11/07* | (2006.01) |
| *G11B 20/18* | (2006.01) |

(52) U.S. Cl.
CPC ........... *G06N 20/00* (2019.01); *G06F 11/076* (2013.01); *G06F 11/0727* (2013.01); *G11B 20/10037* (2013.01); *G11B 20/10055* (2013.01); *G11B 20/1833* (2013.01); *G11B 2020/185* (2013.01)

(58) Field of Classification Search
None
See application file for complete search history.

(56) References Cited

U.S. PATENT DOCUMENTS

| | | | |
|---|---|---|---|
| 5,381,359 A | 1/1995 | Abbott et al. | |
| 5,594,597 A | 1/1997 | Padden | |
| 5,610,776 A | 3/1997 | Oh | |
| 5,699,487 A | 12/1997 | Richardson | |
| 5,978,782 A | 11/1999 | Neely | |
| 6,043,946 A | 3/2000 | Genheimer | |
| 6,052,349 A * | 4/2000 | Okamoto ......... | G11B 20/10009 369/47.26 |
| 6,384,995 B1 * | 5/2002 | Smith .................... | G11B 27/36 360/25 |
| 6,862,152 B2 | 3/2005 | Wu | |
| 7,089,483 B2 | 8/2006 | McEwen et al. | |
| 7,502,766 B2 | 3/2009 | Dodgson | |

(Continued)

FOREIGN PATENT DOCUMENTS

CN    107291382 A    10/2017

OTHER PUBLICATIONS

Pedregosa et al., Scikit-learn: Machine Learning in Python, JMLR 12, pp. 2825-2830, 2011.
Galbraith, Richard et al., "Iterative Detection Read Channel Technology in Hard Disk Drives," Nov. 2008, 8 pages.
Nguyen, Dong et al., Abstract of "Joint network coding and machine learning for error-prone wireless broadcast," Computing and Communication Workshop and Conference (CCWC), 2017 IEEE 7th Annual, Jan. 9-11, 2017, 3 pages. <http://ieeexplore.ieee.org/document/7868415/>.

(Continued)

*Primary Examiner* — Peter Vincent Agustin
(74) *Attorney, Agent, or Firm* — Patent Law Works LLP

(57) ABSTRACT

Technology for improved data detection using machine learning may include a method in which an analog read signal comprising data read from a non-transitory storage medium of the data storage device is received. The analog read signal is processed into a plurality of digital samples. A digital sample from the plurality of digital samples is classified into a category from a plurality of categories using a machine learning algorithm for at least some of the plurality of digital samples. The plurality of digital samples is then decoded based on at least some of the predicted categories.

23 Claims, 12 Drawing Sheets

(56) References Cited

U.S. PATENT DOCUMENTS

| | | | |
|---|---|---|---|
| 7,558,012 B2 | 7/2009 | Lee | |
| 8,995,074 B1 | 3/2015 | Low | |
| 9,047,205 B1 | 6/2015 | Chen et al. | |
| 9,516,237 B1 * | 12/2016 | Goyal | H04N 5/3535 |
| 9,619,379 B1 | 4/2017 | Chan et al. | |
| 9,761,273 B1 | 9/2017 | Chen | |
| 10,056,920 B1 | 8/2018 | Chen et al. | |
| 10,063,257 B1 | 8/2018 | Chen | |
| 2003/0152175 A1 | 8/2003 | Kuki et al. | |
| 2004/0268208 A1 | 12/2004 | Radich | |
| 2007/0044000 A1 | 2/2007 | Shen et al. | |
| 2010/0185914 A1 | 7/2010 | Tan et al. | |
| 2014/0363143 A1 * | 12/2014 | Dharssi | G11B 27/036 386/282 |
| 2015/0332127 A1 * | 11/2015 | Zheng | G06K 9/6202 382/165 |
| 2016/0093273 A1 * | 3/2016 | Wang | G01S 3/781 345/428 |
| 2017/0148482 A1 | 5/2017 | Wu et al. | |
| 2019/0385094 A1 * | 12/2019 | Alex | G11B 20/10037 |

OTHER PUBLICATIONS

Park, Jinsoo et al., Abstract of "Prediction of information propagation in a drone network by using machine learning," 2016 International Conference on Information and Communication Technology Convergence (ICTC), Oct. 19-21, 2016, 3 pages. <http://ieeexplore.ieee.org/document/7763456/>.

Robb, Drew et al., "Top 10 AI and Machine Learning Data Storage Trends," Enterprise Storage Forum, May 4, 2017, 3 pages. <http://www.enterprisestorageforum.com/storage-management/top-10-ai-and-machine-learning-data-storage-trends.html>.

"CogniMem Technologies Inc., Cognitive Computing, Pattern Recognition Chip Company." www.cognimem.com/, Oct. 23, 2018.

"User:Magnus Manske." Wikipedia, Wikimedia Foundation, en.wikipedia.org/w/index.php?title=Viterbi_algorithm&oldid=8. Edited Jan. 26, 2002.

Gupta, Chirag, et al., "ProtoNN: Compressed and Accurate kNN for Resource-scarce Devices." Proceedings of the 34th International Conference on Machine Learning, PMLR 70:1331-1340, 2017.

* cited by examiner

MACHINE LEARNING-BASED READ CHANNEL DATA DETECTION

TECHNICAL FIELD

The present disclosure relates to data detection. In particular, the present disclosure relates to improved read channel data detection using machine learning.

BACKGROUND

In present-day data transmission and storage mediums, such as disk, tape, optical, mechanical, and solid-state storage drives, data detection is based in large part on techniques developed in the early years of the data storage industry. While recently developed read channels invoke relatively new data encoding and detection schemes such as iterative detection and low-density parity codes (LDPC), much of the signal processing power in today's read channels is still based on partial-response maximum-likely-hood detection (PRML), developed in the early 1990's. PRML-based read channels perform best when the read-back waveforms are linear (i.e., undistorted) and dominated by additive white Gaussian noise (AWGN). In practice, a typical read-back waveform is neither linear nor dominated by AWGN, especially at high areal densities.

When a hard disk drive is assembled and tested, the read channel is typically tuned or optimized for every media surface in the drive in order to minimize the bit error rate (and maximize data recovery performance). Read channel tuning is conducted for each media surface because each surface has its own recording mechanism (e.g., recording head), and recording mechanism variations can be the source of much of the surface-to-surface performance variations in a storage drive (e.g., hard disk drive).

The read channel generally has a finite impulse response (FIR) filter with variable weights that are adjusted to match the selected target value. This equalization procedure is performed in conjunction with an analog filter in the channel front-end that determines the cutoff and boost applied to the read-back signal from the head. However, this procedure is often performed during the read-back of many data samples from many different data patterns, and as such, should generally be considered an "average" optimization. Some data patterns will have better error rates than others, and an "average" optimization is performed to give the best error rate for the worst data pattern.

Overall, today's detectors are based on the Viterbi algorithm, which is the de facto detector for linear channels dominated by AWGN. Unfortunately, the Viterbi algorithm is not effective for systems with nonlinearities and colored noise, such as in a recording system, which has nonlinear distortion.

Thus, there is a need for technology that efficiently handles a variety of different read-back waveforms and primary types of noise in the read channel to improve error rate performance of data transmission and/or storage devices.

SUMMARY

The present disclosure describes various aspects of innovative technology capable of read channel data detection using machine learning (ML). In one example, the ML-based data detection provided by the technology is applicable to a variety of computer systems, such as storage networks, storage systems, and/or signal transmission networks and is dynamically configurable and adaptable based on the characteristics of the input data, in contrast to current approaches that require manual calibration.

In general, one innovative aspect of the subject matter described in this disclosure may be embodied in a novel read channel circuit, comprising: an analog to digital converter (ADC) configured to receive an analog read signal and convert the analog read signal into a plurality of digital samples; a machine learning detector coupled to the ADC, the machine learning detector being configured to receive the plurality of digital samples from the ADC and predict to which category, from a plurality of categories, a digital sample from the plurality of digital samples belongs, for at least some of the plurality of digital samples; and a decoder configured to decode the plurality of digital samples based on at least some of the predicted categories.

These and other implementations may each optionally include one or more of the following features: that the read channel circuit further comprises an electronic finite impulse response (FIR) filter situated between the ADC and the machine learning detector, the FIR filter configured to receive the plurality of digital samples and process the plurality of digital samples for input into the machine learning detector; feature vectors in a training data set for training the machine learning detector have a feature vector length between 5 and 15 FIR samples; the machine learning detector is trained using a training data set comprising one of a plurality of electronic finite impulse response samples and a plurality of ADC samples; the machine learning detector comprises one of a K-nearest neighbors algorithm and a support vector machine model; the machine learning detector comprises a plurality of detectors that are configured to process each digital sample independently in parallel, each detector from the plurality of detectors being configured to output a probability value for each digital sample reflecting a probability of that digital sample belonging to a category; the read channel circuit further comprising a comparator configured to receive the probability value output by each detector from the plurality of detectors for each digital sample, and select a final probability for each digital sample based on the probability value output from each detector for that digital sample; the probability value is a value between 0 and 1; and the read channel circuit further comprises a variable gain amplifier (VGA) configured to control a signal level of the analog read signal based on a gain determined by an automatic gain control loop, and a continuous time filter (CTF) configured to limit signal bandwidth.

In general, another innovative aspect of the subject matter described in this disclosure may be embodied in a reception circuit of a transceiver, comprising: an analog to digital converter (ADC) configured to receive an analog input signal and convert the analog input signal into a plurality of digital samples; a machine learning detector coupled to the ADC, the machine learning detector being configured to receive the plurality of digital samples from the ADC and predict to which category, from a plurality of categories, a digital sample from the plurality of digital samples belongs, for at least some of the plurality of digital samples; and a decoder configured to decode the plurality of digital samples based on at least some of the predicted categories.

In general, another innovative aspect of the subject matter described in this disclosure may be embodied in a data storage device comprising: a non-transitory storage medium; and control circuitry configured to receive an input signal comprising data read from the non-transitory storage medium, the input signal including a non-linear and distorted waveform, process the input signal into a plurality of digital samples, classify, using a machine learning algorithm, a digital sample from the plurality of digital samples into a category from a plurality of categories for at least some of the plurality of digital samples, decode the plurality of digital samples based on at least some of the predicted categories, and descramble the decoded plurality of digital samples to reveal the data read from non-transitory storage medium.

In general, another innovative aspect of the subject matter described in this disclosure may be embodied in a method for operating a data storage device, the method comprising: receiving an analog read signal comprising data read from a non-transitory storage medium of a non-transitory data storage device; processing the analog read signal into a plurality of digital samples; classifying, using a machine learning algorithm, a digital sample from the plurality of digital samples into a category from a plurality of categories for at least some of the plurality of digital samples; and decoding the plurality of digital samples based on at least some of the predicted categories.

In general, another innovative aspect of the subject matter described in this disclosure may be embodied in a method for data transmission, the method comprising: receiving a data transmission comprising an input signal; processing the input signal into a plurality of digital samples; classifying, using a machine learning algorithm, a digital sample from the plurality of digital samples into a category from a plurality of categories for at least some of the plurality of digital samples; and decoding the plurality of digital samples based on at least some of the predicted categories.

Other aspects include corresponding methods, systems, apparatus, and computer program products for these and other innovative aspects.

The various aspects of the novel technology described herein include a number of innovative technical features and advantages over prior solutions, including, but not limited to: (1) improved data detection in a storage device, (2) reduced channel complexity of a read/write channel, and (3) flexibility to be adapted to data detection and analysis in a variety of different fields.

For instance, the technology may increase the performance of a storage system through enhanced data detection in the storage system. By including an ML classifier in the read path of a storage system, the data detection process may be conducted in a "smart" machine learning detector, a novel departure from how data is detected and recovered in conventional storage systems. By recording and reading back user-defined data patterns, the machine-learning classifier included in the storage system can be trained to recover data with lower error rates than conventional hardware channels from which the data patterns are captured. Additionally, by training the ML classifier with specifically-defined data patterns, the machine learning detector can allow accurate detection of a wide variety of channel samples in the reading process, even in the presence of high noise and distortion.

Further, as the samples fed into the machine learning detector in the read path are not required to be processed by certain conventional hardware channel components (e.g., noise whitening filter, Viterbi-like detector, etc.), these conventional components in the conventional read path, and also certain conventional components in the write path, can be removed from the read/write channel, thereby reducing channel complexity of the data storage system.

Moreover, the technique provided in the present disclosure is not limited to storage systems but may be used for data detection and data analysis in other fields. For instance, the disclosed machine learning detector can be applied to data detection in data transmissions in various fields, such as optical, tape, fiber optics, cellular network, computer networks, bus communications, etc.

It should be understood that the above list of features is not all-inclusive and many additional features and advantages, such as but not limited to those discussed below, are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The techniques introduced herein are illustrated by way of example, and not by way of limitation, in the figures of the accompanying drawings in which like reference numerals are used to refer to similar elements.

DETAILED DESCRIPTION

Novel data processing technology, such as but not limited to systems, devices, and methods for detecting, classifying and/or recovering data in data reading and transmission processes using machine learning (ML) techniques are disclosed. While this technology is described below in the context of a particular system architecture in various cases, it should be understood that the systems and methods can be applied to other architectures and organizations of hardware.

Figure 1:
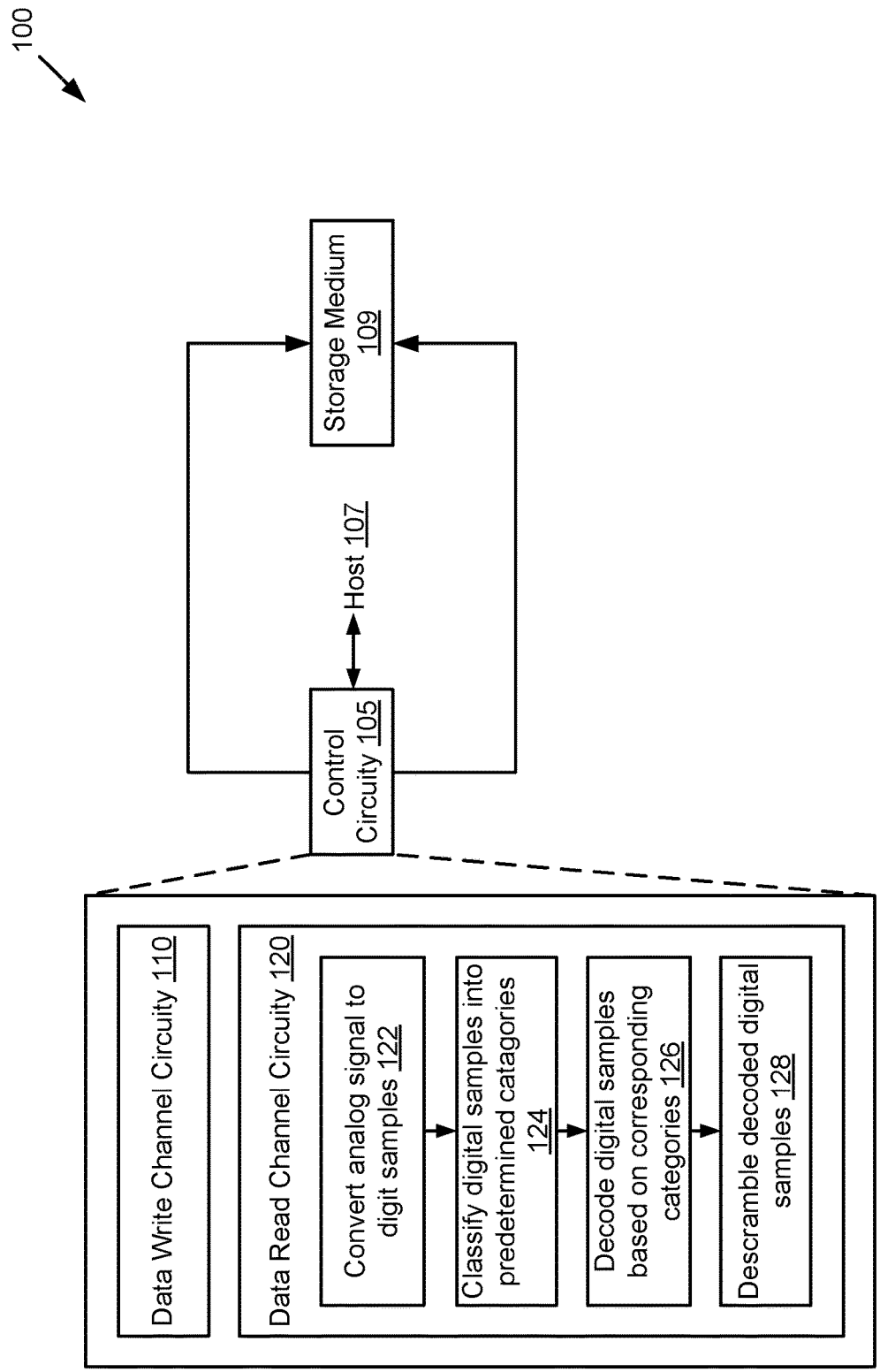
FIG. 1 is a block diagram of an example system having innovative data processing components.

FIG. 1 is a block diagram illustrating an example storage system 100 having innovative data processing components. As illustrated, the storage system 100 includes control circuitry 105, a host computing system 107 (may be simply referred as "host"), and a storage medium 109. The storage medium 109 may comprise any suitable storage medium including, but not limited to a hard disk drive (HDD), a solid-state drive (SSD), a flash drive, an optical drive, a tape drive, an older form of drive such as floppy drives, volatile or non-volatile memory, etc.

The host 107 is a computer system to which the storage medium 109 is coupled and/or with which the storage medium 109 is integrated. The storage medium 109 is accessible for data storage and I/O (input/output) operations. For instance, the host 107 may issue commands for data manipulation in the storage medium 109. The control circuitry 105 mediates the communication between the host 107 and the storage medium 109 and provides an interface between the storage medium 109 and a bus connecting it to the rest of the system. As illustrated in the figure, the control circuitry 105 may include data write channel circuitry 110 for data writing execution and a data read channel circuitry 120 for data reading execution. In the disclosed embodiments, the control circuitry 105 may employ machine-learning techniques to improve error rate performance and/or provide data recovery functionality.

When reading data from the storage medium 109, the control circuitry 105 may receive a command signal from the host 107, which instructs the control circuitry 105 to access a certain portion of storage medium 109 (e.g., the locations of blocks on a magnetic disc, in memory, etc.) to be accessed. As a further example, in an embodiment involving an HDD, in response to the command signal, servo electronics within the control circuitry 105 may produce control signals that position a data head over a desired track in the storage drive, which develops a read signal indicative of flux reversals in the track over which the data head is positioned.

Figure 2:
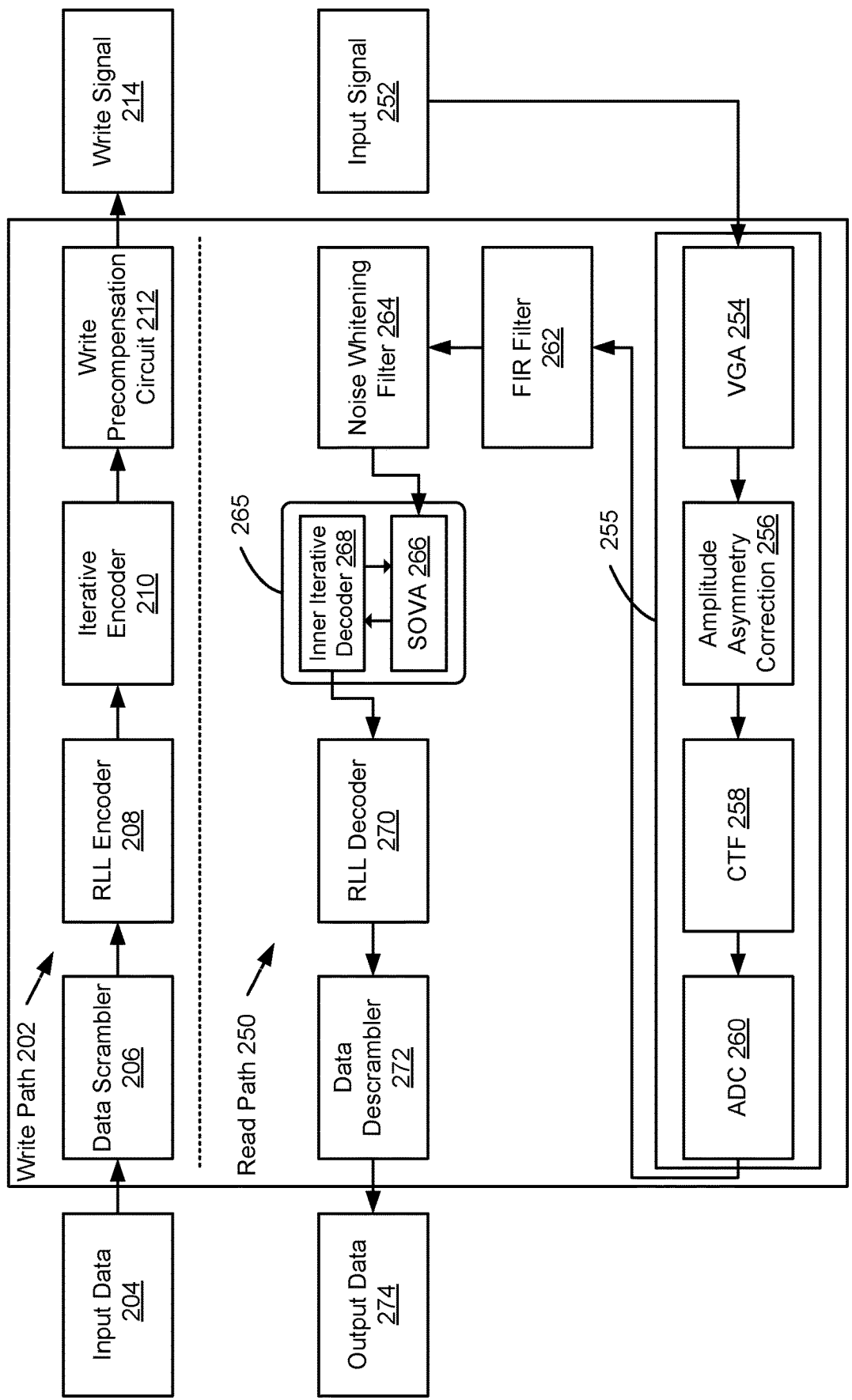
FIG. 2 is a block diagram of an existing storage system including various data processing components.

An input signal (e.g., the read signal) may, in some cases, be provided to preconditioning logic in the data read channel circuitry 120, which may include a preamplifier, an analog to digital converter (ADC) and/or filtering circuitry, as is described elsewhere herein, such as with reference to FIG. 2. As shown in block 122, the ADC may convert analog signals into digital samples. The amplified and filtered input signal may then be provided to data detection and recovery circuitry, which may detect and recover data, for instance, through an ML-based classification of the digital samples into predetermined categories in block 124. The classified samples may then be decoded based on the corresponding categories in block 126, and further descrambled in block 128. The descrambled data may then be provided to the host computing system 107 in response to a read command signal received from the host 107.

As previously discussed, the data detection and recovery schemes employed by existing read channels are designed under the assumption that AWGN is present in disc drives and the read-back waveforms are linear, and thus a Viterbi-like detector with a noise whitening filter is employed in the existing data detection and recovery schemes. However, in real applications, a typical read-back waveform is often neither linear nor dominated by AWGN, especially at high areal densities.

Advantageously, the data detection and recovery technology disclosed hereby includes an ML classifier in the read channel that classifies digital samples into predetermined categories, as shown in block 124 in FIG. 1. Unlike prior solutions that use a Viterbi-like detector and noise whitening filter, the ML classifier can detect and recover nonlinear and non-AWGN read-back waveforms efficiently and with a high degree of confidence, thus improving the reliability of the control circuitry 105 in data processing. Additionally, based on the types and/or numbers of ML classifiers used in the ML detector(s) in the read channel, the degree to which the classifiers have been trained, classifier hyperparameters, the signal-to-noise of the components, etc., additional components in the known read/write path may be further removed, which can yield a reduction in read channel complexity and structure in the control circuitry 105 of the storage system 100.

It should be noted that while the ML detector-based control circuitry 105 is illustrated above in a single storage system 100 in FIG. 1, the disclosed ML detector can also be integrated into a larger storage system, for example, a RAID (redundant array of inexpensive disks or redundant array of independent disks)-based storage system, a storage rack and/or head unit, a cloud storage system, data transmission infrastructure, network appliances (e.g., switches, routers, firewalls, etc.), etc.

In an example RAID storage system, data may be spread across a number of disks according to a variety of algorithms and accessed by an operating system as if it were a single disk. In a write operation, write data may be provided to an ML detector-incorporated control circuitry, which then stores the write data across the disks, for example by mirroring or by striping the write data. In a read operation, the ML detector-incorporated control circuitry may retrieve the data from the disks. The ML detector-incorporated control circuitry may then yield the resulting read data as if the RAID storage system were a single disk.

Referring to FIG. 2, a block diagram illustrating a configuration 200 comprising components employed in a known read/write path of a storage system. As illustrated, the write path 202 includes a data scrambler 206, a run-length limited (RLL) encoder 208, an iterative encoder 210, and a write precompensation circuit 212. A write signal 214 may be output by the write path in some embodiments. The read path 250 includes a variable gain amplifier (VGA), 254, an amplitude asymmetry correction component 256, a continuous time filter (CTF) 258, an ADC 260, a FIR filter 262, a noise whitening filter 264, a SOVA (soft output Viterbi algorithm) 266, an inner iterative decoder 268, a RLL decoder 270, and a data descrambler 272. These component(s) receive input signals 252, and process, decode, and output the signals as output data 274.

The data scrambler 206 "randomizes" input data 204 ("whitens" the input sequence of the data) to be written into a storage media. In general, a storage system has no control over the data the user is going to write. This causes problems because it violates the assumptions that are usually made when designing storage systems, such as having independent data symbols. Since the data are not random, a frequently occurring problem is long strings of zeros in the data, which can cause difficulties in later timing recovery and adaptive equalization. These problematic sequences can be removed (or, actually, made much less likely) by introducing randomization of the input sequence for the input data 204. Therefore, during the data writing process, input data 204 may be first randomized by the data scrambler 206.

The RLL encoder 208 modulates the length of stretches in the randomized data. The RLL encoder 208 employs a line coding technique that processes arbitrary data with bandwidth limits. Specifically, the RLL encoder 208 can bound the length of stretches of repeated bits so that the stretches are not too long or too short. By modulating the data, the RLL encoder 208 can reduce the timing uncertainty in later decoding the stored data which would lead to the possible erroneous insertion of bits when reading the data back, and thus ensure the boundaries between bits can always be accurately found.

The iterative encoder 210 can append one or more parity bits to the modulated block code for later detection whether certain errors occur during data reading process. For instance, an additional binary bit (a parity bit) may be added to a string of binary bits that are moved together to ensure that the total number of "1"s in the string is even or odd. The parity bits may thus exist in two different types, an even parity in which a parity bit value is set to make the total number of "1"s in the string of bits (including the parity bit) to be an even number, and an odd parity in which a parity bit is set to make the total number of "1"s in the string of bits (including the parity bit) to be an odd number. The iterative encoder 210 may implement iterative encoding techniques to reuse the decoder architecture, thereby reducing circuit space.

The write precompensation circuit 212 can alleviate the effect of nonlinearities in the writing process. Major causes of the nonlinearities during data writing include bandwidth limitations in the write path and the demagnetizing fields in the magnetic medium for magnetic disks. These nonlinearities can cause data pattern-dependent displacements of recorded transitions relative to their nominal positions. The write precompensation circuit 212 can compensate for these data pattern-dependent displacements by introducing data pattern-dependent compensating shifts into the signals. After compensation, the information may then be written as NRZ (non-return to zero) data.

In an HDD embodiment, when reading data back from the storage medium, the data head of a storage drive senses the transitions (changes) in the storage medium and converts the information back into an electronic waveform. Reading a signal in a storage medium starts at the storage medium (e.g., the drive's storage platter) and head transducer. The head transducer is located prior to the preamp data in the data read path and the head transducer output is driven by data pattern previously written on a rotating disk. After converting into an electronic waveform, the head transducer output may be further processed by the components illustrated in FIG. 2 in the read path 250 for data detection, decoding, and descrambling.

The VGA 254 amplifies the analog signal read back from the storage medium. The VGA 254 controls a signal level of the read-back analog signal based on a gain determined by an automatic gain control loop. One main function of the automatic gain control loop is to control an input signal level for optimum performance in the ADC 260. Too much gain from the VGA 254 can cause sample values in the ADC 260 to rail at maximum or minimum ADC levels, while too little gain can cause quantization noise to dominate the SNR (signal-to-noise ratio) and thus adversely affect bit error rate performance.

The AAC 256 and the CTF 258 work to linearize the amplified analog signal prior to feeding it to the ADC 260. In an HDD embodiment, the AAC 256 works to reconstruct linearity that may have been lost in the head transducer stage when the information on the storage disk is converted into an electronic signal at the output of the data head. The biasing of the head signal may in some cases be adjusted to keep the signal in the linear range of the head sensitivity curve. However, if the signal amplitude changes due to fly height or disk variation exceed the head transducer linear range, saturation in the peak or trough of the electrical head signal can occur. The AAC 256 may use signal offset to determine the amount of squared signal to add back to restore the positive and negative symmetry of the signal.

It should be noted that in practice, the read back analog signals from many different commonly used heads in existing devices cannot be linearized, regardless of the kind of biasing approach that is employed. The ML classifier-based data detection and recovery technology disclosed herein can advantageously handle the read back signals from these types of heads because it does not require them to be linearized as described elsewhere herein.

The CTF 258 provides mid-band peaking to help attenuate high-frequency noise and minimize any aliasing that may occur when the analog signal is converted to a sampled representation. In an HDD embodiment, aliasing may not have a large effect on a drive surface's bit error rate performance. However, it can have an impact on disk drive manufacturing yields. The CTF 258 is typically a multiple pole low pass filter (e.g., a four pole Butterworth filter) with a zero available for mid-band peaking. Signal peaking can be used to emphasize frequency components, which are useful in shaping the signal to meet the digital target signal characteristic. Besides anti-aliasing, the CTF 258 may also partially equalize the data.

The ADC 260 can convert an analog signal (e.g., input signal 252 and/or 352), as input and/or processed by upstream components) to digital samples quantized in time and amplitude. The clock used may include the output of a digital phase-locked loop, which tracks the channel rate clock frequency. The output of the ADC may be used as feedback to control the timing of the digital phase-locked loop as well as the automatic gain control, DC baseline correction, and FIR adaptation. The VGA 254, the CTF 258, and the ADC 260, with or without the AAC 256, together may be called an analog front end 255, as the signals processed in these components are analog, while the signals in the remaining downstream components of the read path may be digital, although other variations of an analog front end 255 (which may be considered as one example form of an analog to digital convertor) may comprise software and/or hardware elements configured to convert signals from analog to digital and/or include other components for filtering, tuning, and/or processing data. In an HDD embodiment, the read channel analog front-end functions are generally similar regardless of whether the data is recorded using perpendicular or horizontal techniques.

The FIR filter 262 performs filtering to provide additional equalization of the signal to match signal characteristic to the desired target response for bit detection. As with all components of the analog front end 255, the performance of FIR 262 is important to achieve the ideal architectural target response. While the function of filtering is consistent with horizontal recording designs, the optimal targets for perpendicular waveforms have changed so the allowable tap gain ranges have been adjusted to help filter the waveform to match the target.

The noise whitening filter 264 further equalizes the spectrum of the signal from the FIR samples to remove noise that has non-flat amplitude spectrum. The noise whitening filter 264 works similarly to the automatic filter that enhances low-level spectral components and attenuates high-level ones. At the output of the noise whitening filer 264, the signal is now in a fully digital form ready for detection. The sample stream is submitted to the sequence detector to begin decoding in trellises for bit recovery.

The SOVA 266 may use a Viterbi-like algorithm to decode a bit stream for bit recovery. The SOVA 266 may include a variant of the classical Viterbi algorithm. It may differ from the classical Viterbi algorithm in that it uses a modified path metric which takes into account a priori probabilities of the input symbols, and produces a soft output indicating the reliability of the decision. The SOVA 266 operates by constructing a trellis of state of probabilities and branch metrics. Once the bit recovery is completed, parity post-processing can be performed.

The inner iterative decoder 268 may help to ensure that the states at the parity block boundary satisfy the parity constraint by conducting parity error checking to determine whether data has been lost or written over during data read/write processes. It may check the parity bits appended by the iterative encoder 210 during the data writing process, and compare them with the bits recovered by the SOVA 266. Based on the setting of the iterative encoder 210 in the data writing process, each string of recovered bits may be checked to see if the "1"s total to an even or odd number for the even parity or odd parity, respectively. A parity-based post processor may also be employed to correct a specified number of the most likely error events at the output of the Viterbi-like detectors by exploiting the parity information in the coming sequence. The SOVA and the inner iterative decoder 268 together may be referred to as an iterative decoder 265, as iterative decoding may exist between the two components.

The RLL decoder 270 may decode the run length limited codes encoded by the RLL encoder 208 during the data writing process, and the data descrambler 272 may descramble the resulting sequence, which eventually can reveal the original user data written into the storage media. The recovered or read data, output data 274 or 374, may then be sent to a requesting device, such as a host computer, network node, etc., in response to receiving the request for the data.

Compared to above-described background read channel circuits in which a Viterbi-like detector (e.g., the SOVA) and a de-correlating (noise whitening) filter are employed in FIR sample processing for data detection, the present disclosure provides data detection enhanced with ML to improve bit error rate performance in data detection with reduced complexity and improved yields.

Various example read channel architectures are illustrated in the following text, such as those described with reference to FIGS. 3A-3F, in which input signals 352 are received, processed, and output as output signals 374, and where an ML detector 366 may supplement and/or replace different components in the known read/write path, although it should be understood that other configurations are also possible and encompassed hereby.

Figure 3A:
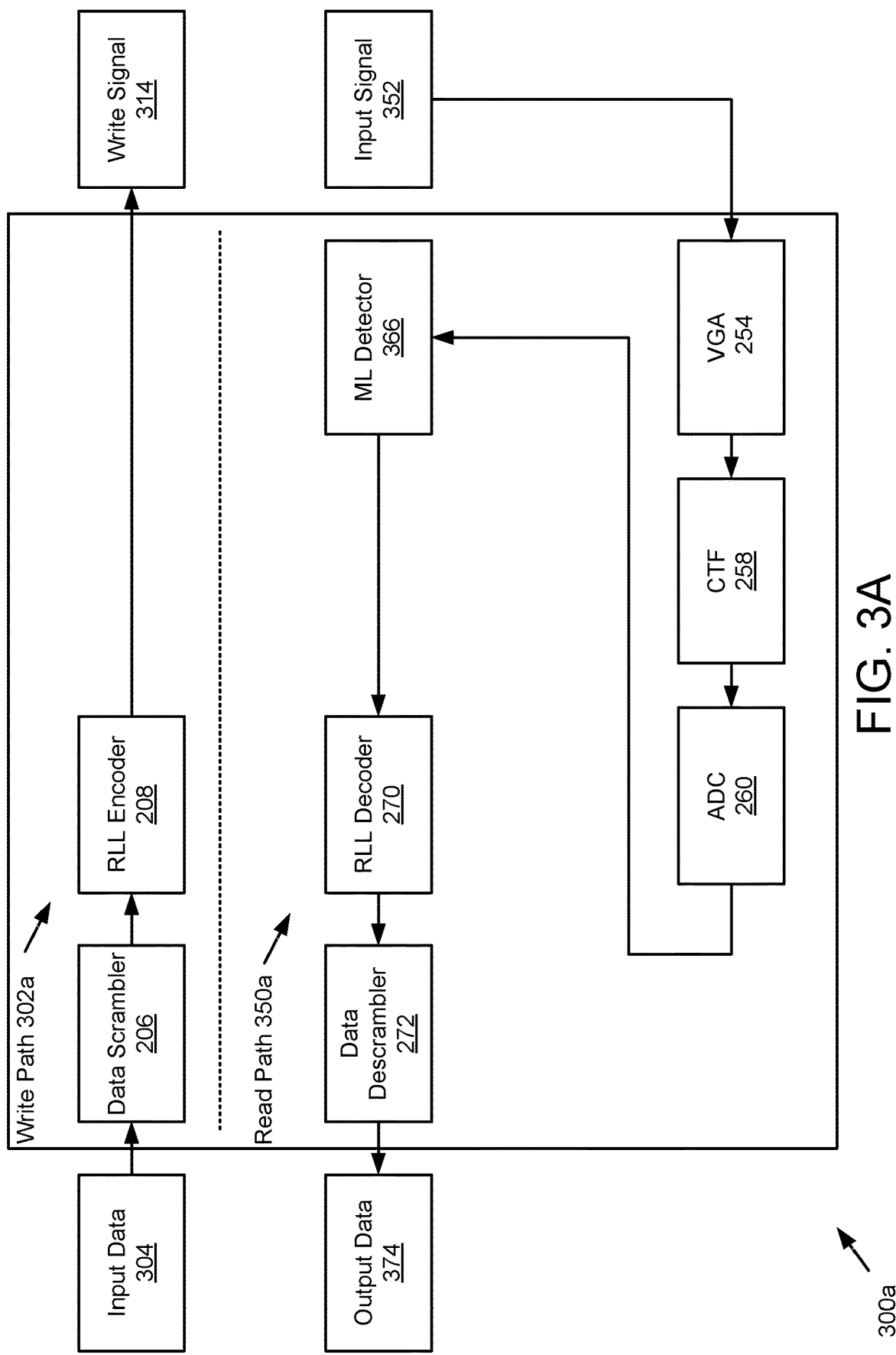
FIGS. 3A-3F are block diagrams of various innovative ML-based data processing configurations provided by this disclosure.

FIG. 3A is a block diagram of an example ML-based data processing configuration 300a in which an ML detector 366 is included in the read path of a storage system and configured to process the input signal 352 (in some cases, as processed by upstream components, such as the ADC 260, CTF 258, VGA 254, etc.). Advantageously, a configuration that includes the ML detector 366 can process a broader range of signal variation than the background art, such as that depicted in FIG. 2. Further, data processing configurations can be simplified relative to background solution, like that depicted in FIG. 2, by incorporating the ML detector(s) 366 described herein (e.g., as shown in FIGS. 3A-3F). For instance, such simplified configurations can simplify the coding and decoding performed by background solutions, such as a Viterbi decoder and/or other data detection components.

The write path 302a may process the input data 204 and output a write signal 314. As shown, by introducing an ML detector 366 in the downstream of the analog front end 255 (also referred to as an analog to digital conversion engine), the iterative encoder 210 and the write precompensation circuit 212 may be removed from the write path 302a, while the asymmetry correction block 256, the FIR 262, the noise whitening filter 264, the SOVA 266, and/or the inner iterative decoder 268 may be specifically removed from the read path 350a.

As discussed elsewhere herein, with a properly-trained ML classifier, the ML detector 366 can accommodate non-linearity and distortion. As such, the asymmetry correction block 256 and the write precompensation circuit 212 (which are often required in a conventional write path) can thus be removed. The ML detector 366 may also eliminate having to include a Viterbi-like detector (e.g., the SOVA 266), which removes the need to whiten the FIR samples. As a result, the noise whitening filter 264 can also be removed.

In some embodiments, the error check and correction processing provided by the inner iterative decoder 268 in the conventional read path 250 may be also removed or simplified, depending on the ML classifier used in the ML detector 366, the degree to which the classifier has been trained, classifier hyperparameters, the signal-to-noise of the components, etc. In the disclosed embodiment, the FIR 262 may be further removed if the ML classifier in the ML detector 366 is properly trained with un-equalized ADC samples instead of equalized FIR samples. Additionally, with the removal of the noise whitening filter 264 and the inner iterative decoder 268 in the read path, the corresponding write precompensation circuit 212 and the iterative encoder 210 in the write path may also be removed, as illustrated in the write path 302a in FIG. 3A.

Figure 3B:
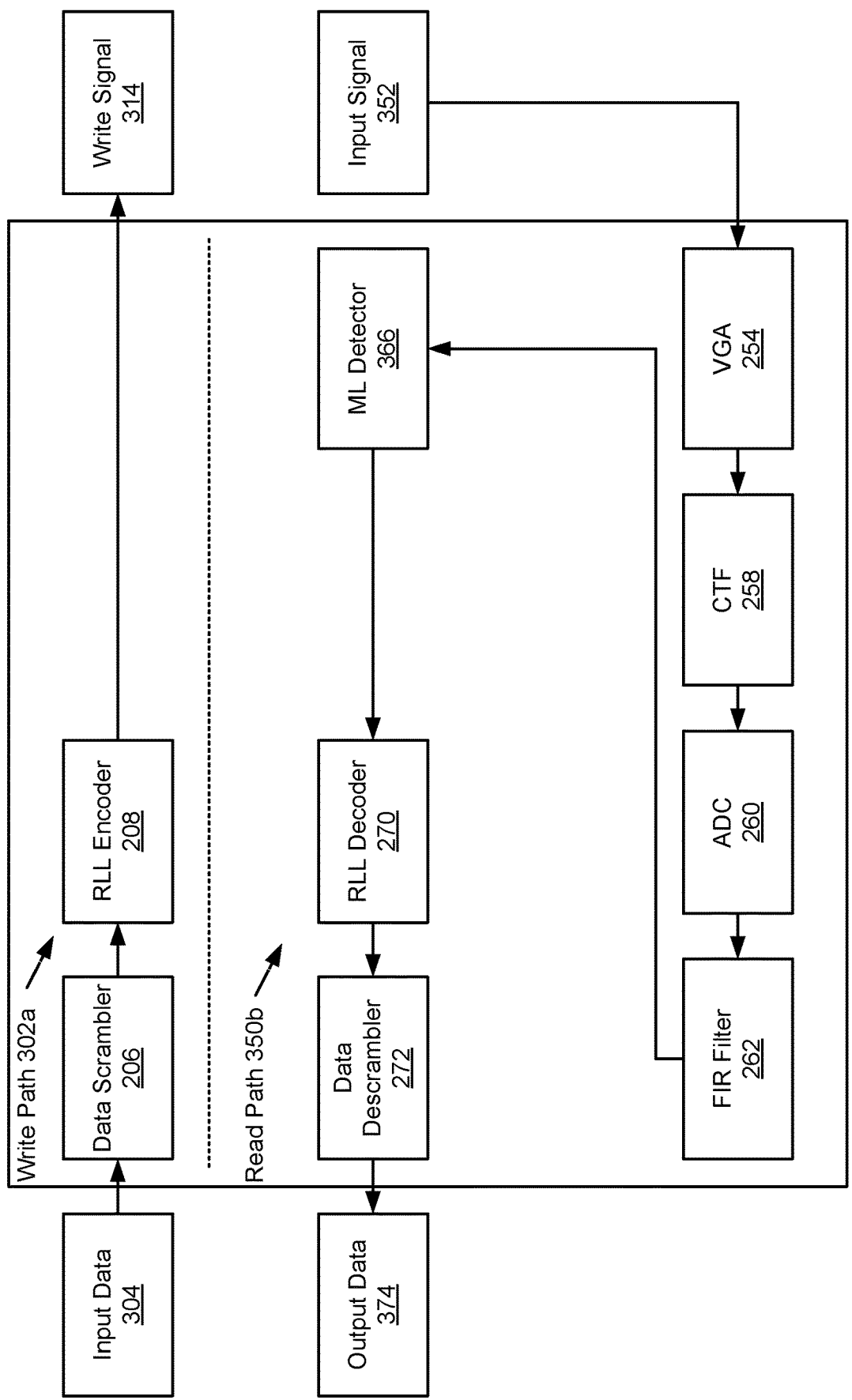

FIG. 3B illustrates an example configuration 300b in which the FIR 262 remains in the read path after the inclusion of the ML detector 366. By maintaining the FIR 262 in the read path 350b in the disclosed storage system, the FIR samples, instead of ADC samples compared to FIG. 3A, can be conveniently collected from hardware channel chips to train an ML classifier in the ML detector 366, as further described in detail with reference to FIGS. 4-6.

Figure 3C:
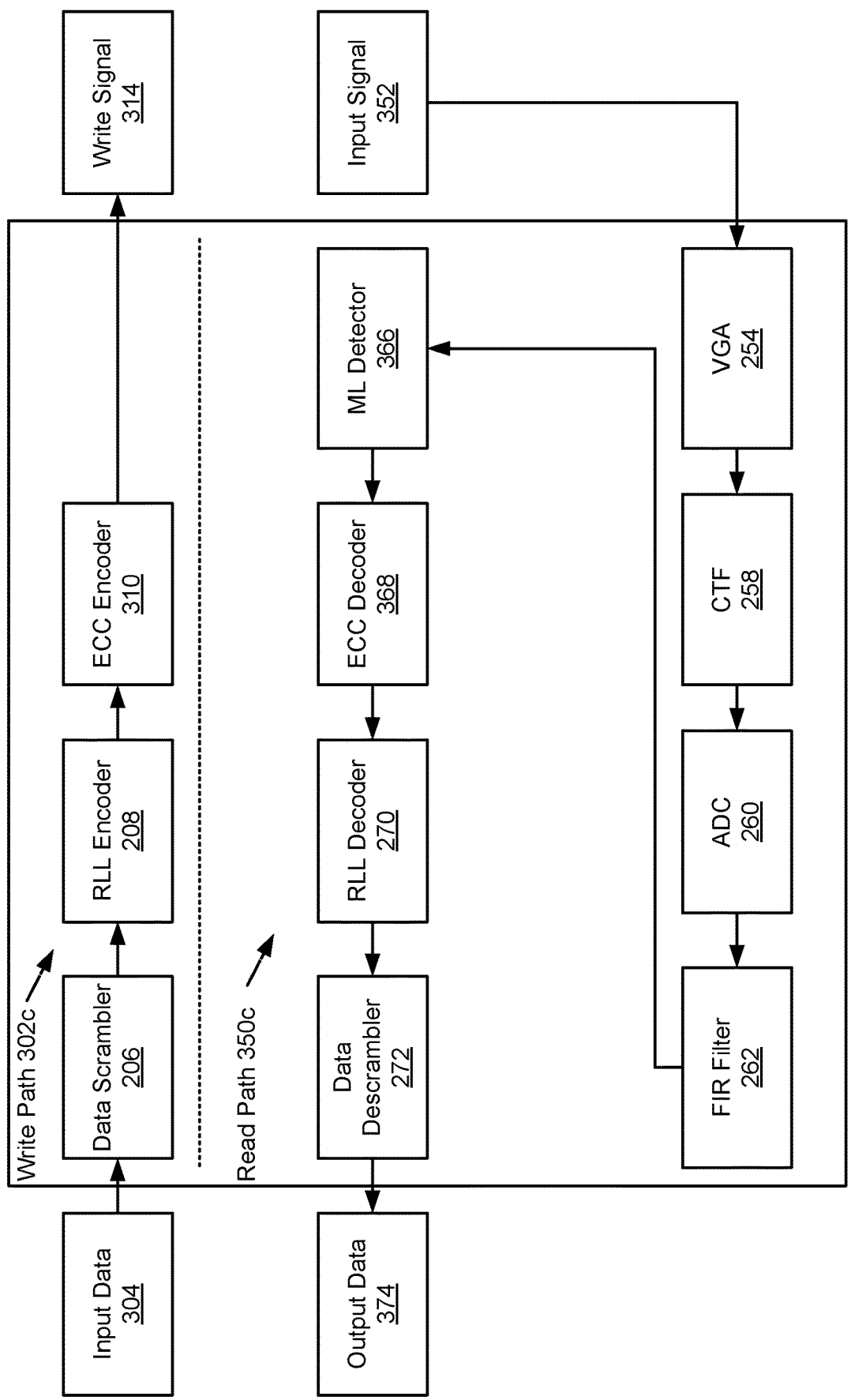

FIG. 3C illustrates an example configuration 300c in which the functions of the iterative decoder 268 are simplified and replaced with an error-correcting code (ECC) decoder 368 due to the introduction of the ML detector 366. The ECC decoder 368 may add redundant data, or parity data, to an output of the ML detector 366, so that the output can be recovered even when a number of errors (up to the capability of the code being used) are introduced, either on data storage or during the process of data transmission, which further improves error correction performance of the disclosed system.

In some embodiments, the ML detector 366 and the ECC decoder 368 may work together in an "iterative" fashion, similar to conventional SOVA 266 and the inner iterative decoder 268. If an ECC decoder 368 is included in the read path 350c, a corresponding ECC encoder 310 may be added to the write path 302c, as illustrated in FIG. 3C. Further, while various embodiments described herein may not be expressly described as including an ECC encoder and ECC decoder, these embodiments may include an ECC decoder and a corresponding ECC encoder.

Figure 3D:
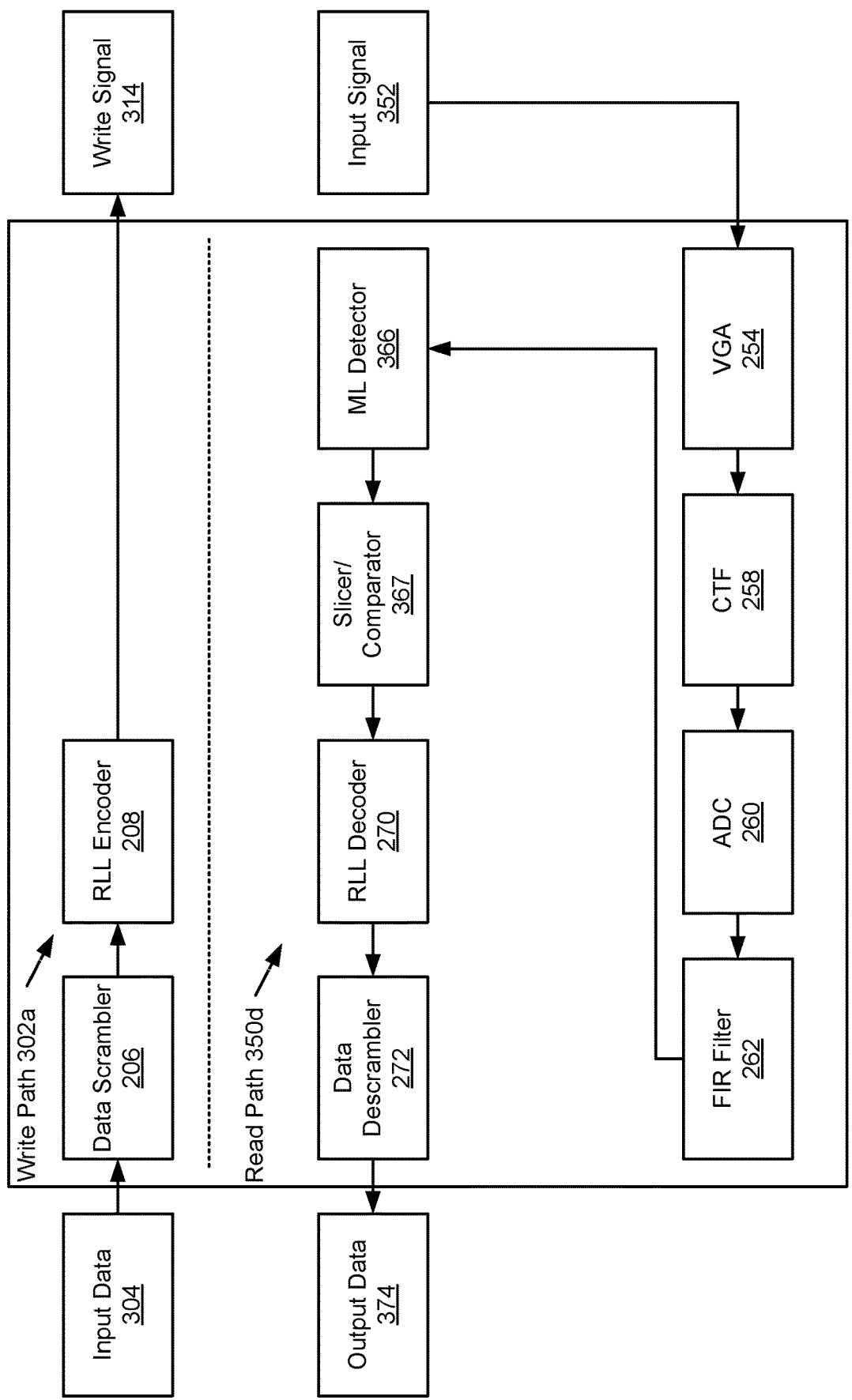

FIG. 3D illustrates an example configuration 300d in which the output of the ML detector is non-binary. In some embodiments, the output the ML detector 366 of the read path 350d may comprise a binary value or some other suitable value (e.g., non-binary), such as a probability value or a measurement of confidence value reflecting that the detected sample is either a "0" or "1". For instance, for certain ML classifiers used in the ML detector 366, their output may be not exactly "0" or "1", but rather a probability value that the detected sample is a "0" or "1". Under this circumstance, a comparator 367 (also called a slicer or slicer/comparator) may be placed downstream of the ML detector 366. The comparator 367 may itself include a threshold value that can be appropriately set to distinguish between "0"s and "1"s. Upon receiving the output from the ML detector 366, the comparator 367 may then determine whether a "0" or "1" should be determined for the received output based on the set threshold value. For instance, a probability value (e.g., a confidence) of 80% that the received output is "1" may then generate a "1" by the comparator 367. In some cases, a comparator may also be used.

Figure 3E:
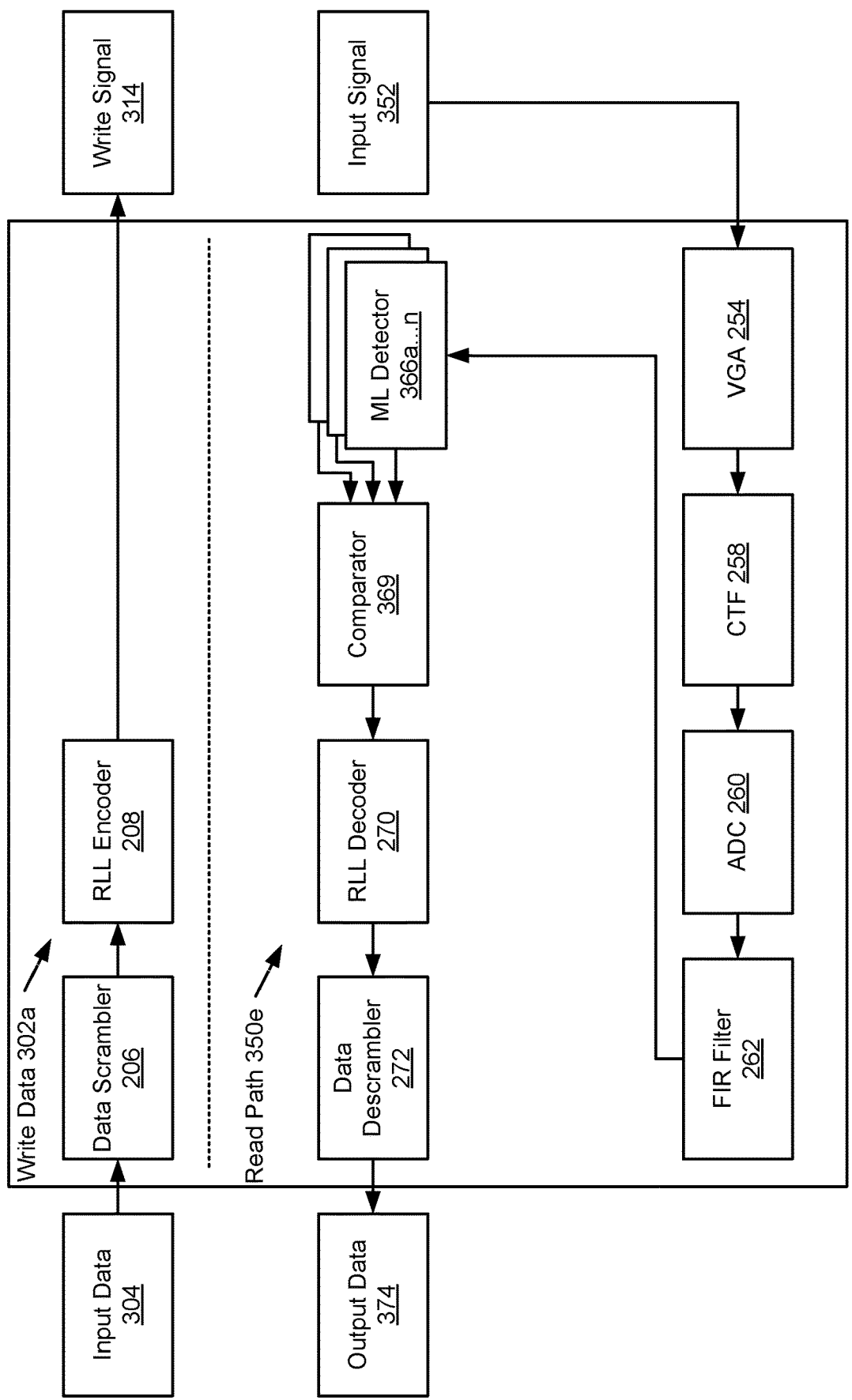

FIG. 3E illustrates an example configuration 300e in which multiple ML detectors 366 are included in the read path of a storage system. In some embodiments, instead of a single ML detector 366 in the read path, multiple ML detectors 366a . . . n may be included in the read path 350e, as illustrated in FIG. 3E. These ML detectors may run in parallel and include different ML algorithms for each ML detector. To determine an outcome of the ML detectors 366a . . . n, a comparator 369 may be further added, to select the result having the highest ensemble probability from the outputs of the included ML detectors 366a . . . n.

It should be noted that while various embodiments of the ML detector 366 are illustrated in FIGS. 3A-3E with reference to the storage system 100, the disclosed ML detector 366 is not limited to the storage systems, but may be extended into data detection and data analysis in other technical fields, such as data transmission in optical, tape, fiber optics, cellular network, etc.

Figure 3F:
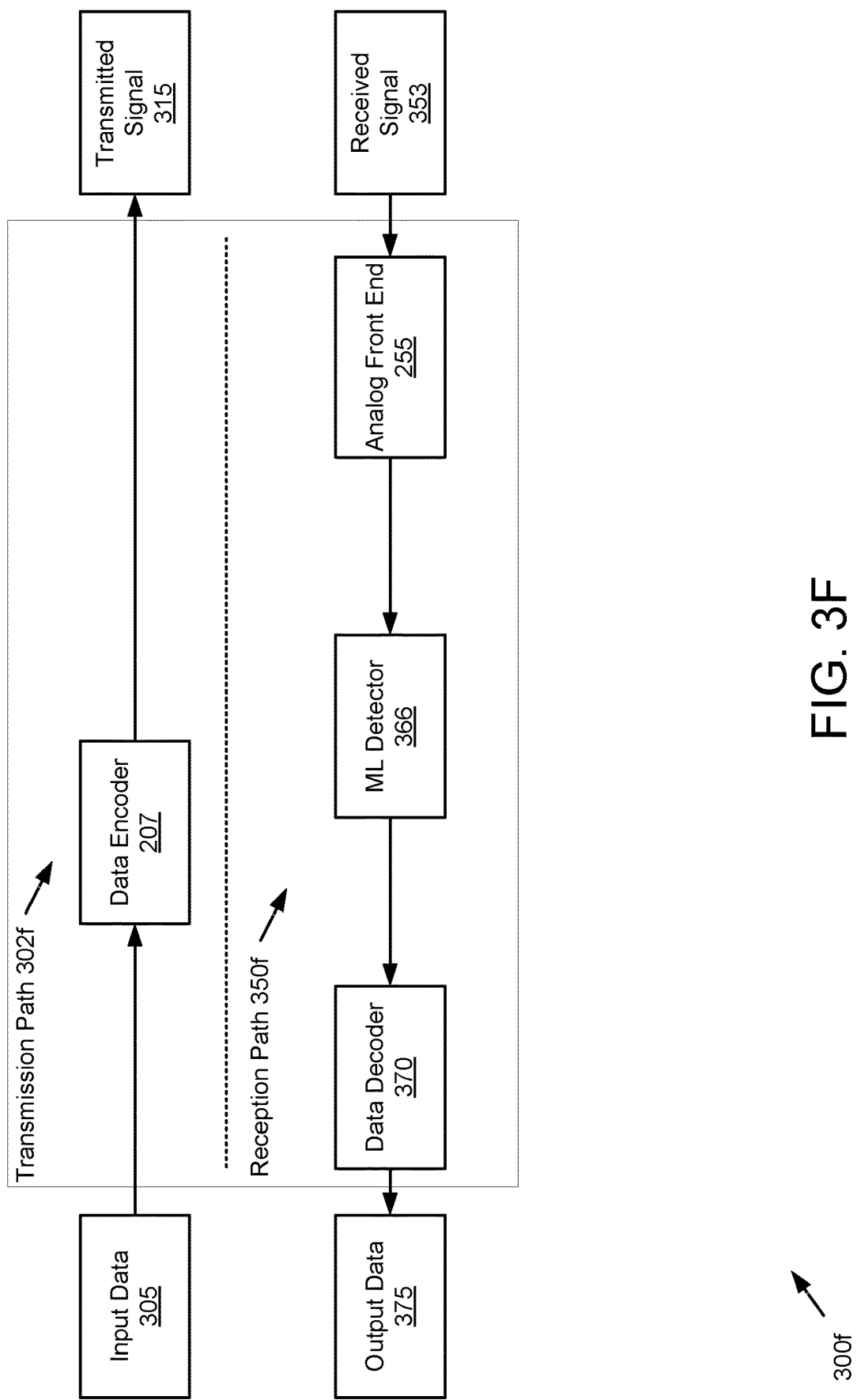

FIG. 3F illustrates an example configuration 300f for data transmission that includes an ML detector 366. For instance, if a transmission link used for data transmission has distortion, known signals sent over the transmission link may be employed to train a receiver (equivalent to an ML detector) that may decode data transmitted with the transmission link with high fidelity. The architecture of such transmission system (e.g., a transceiver) may include a data encoder 207 in the data transmission path 302f that receives and encodes input data 305 (data being transmitted) and outputs a transmitted signal 315. The reception path 350f processes the received signal 353 (the transmitted signal 315 as received at the receiver). In some embodiments, the reception path 350f comprises an analog front end 255 for processing the received signal 353 (e.g., converting it from analog to digital), an ML detector 366, which may receive the sampled data from the analog front end 255 and classify it, and a data decoder 370, which may decode classified data and output it as output data 375, as illustrated in FIG. 3F.

It is to be understood that while the application of the ML detector 366 in the read path or reception path with reference to specific embodiments, the applications of an ML detector are not limited to these embodiments. Multiple combinations of the variations shown in these embodiments may exist for various reasons and depend on the types of the ML classifiers included in the ML detector and how these ML classifiers are trained, among others. For instance, depending on the ML classifier included in an ML detector, in one embodiment, the asymmetry correction block 256 may be removed while the write precompensation circuit 212 may still remain in a read/write path of the storage system 100.

Figure 4:
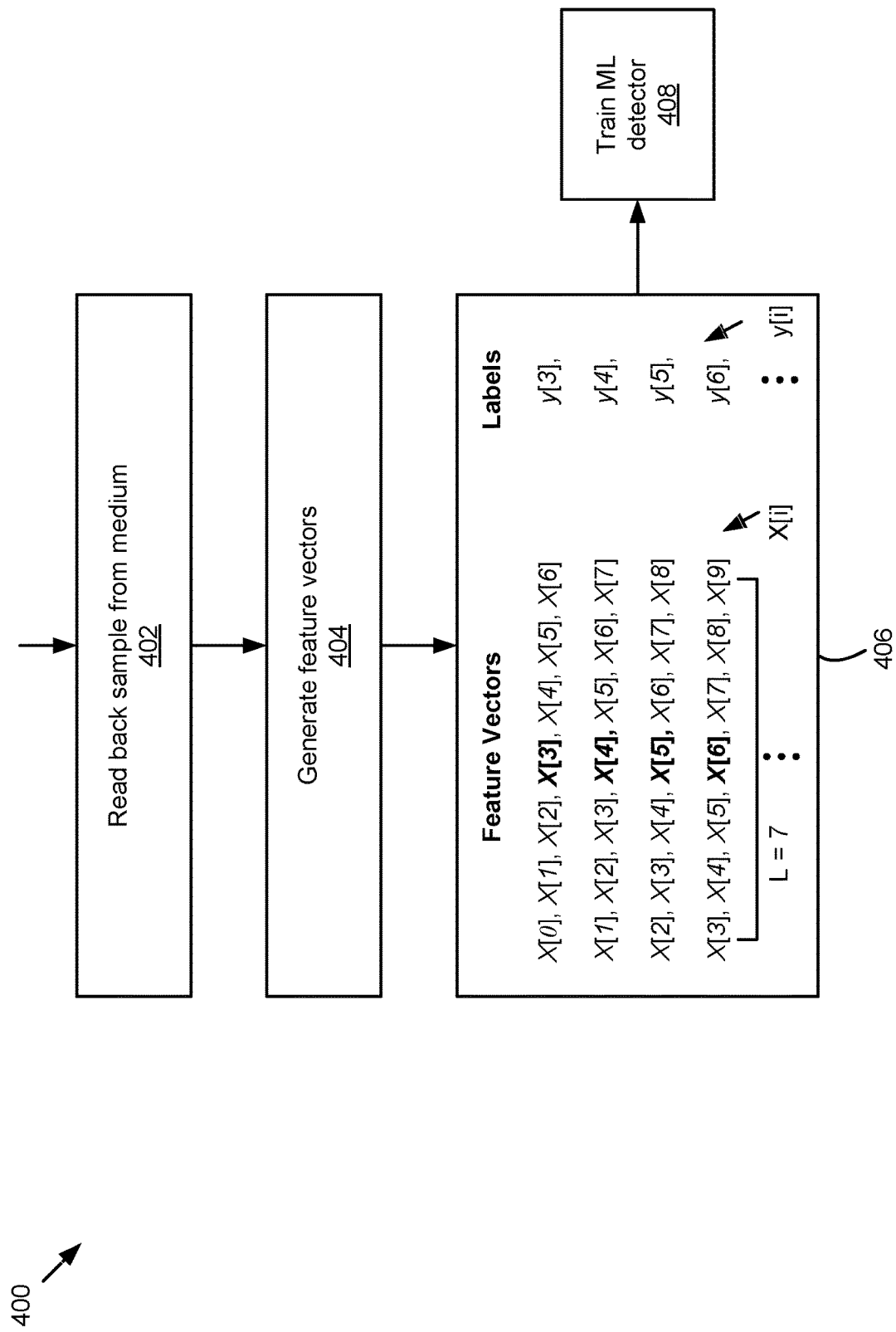
FIG. 4 is a flowchart of an example method for training an ML classifier.

FIG. 4 is a flowchart of an example method 400 for training an ML classifier. Generally, the method 400 can read samples back from a storage medium in block 402, generate feature vectors in block 404, prepare feature vectors and labels for input into an ML classifier in block 406, and train the ML classifier with the prepared feature vectors and labels in block 408.

More particularly, in block 402, the samples (also called channel samples) may, in some embodiments, be read back and collected from channel hardware (e.g., read channel circuitry (e.g., integrated circuits, electronic modules, etc.). Non-limiting examples of channel hardware may comprise read channel hardware manufactured by Marvell™, Broadcom™, or other vendors. The channel samples might correspond to data written into the storage medium with characters before they are read back from the storage medium. By way of example and not limitation, channel samples used for training the ML classifier may include a number of repeated data sequences (e.g., 448 repetitions of a 511-bit un-encoded pseudorandom bit sequence (PRBS) for a total of 228,928 samples of bits) that are specifically designed with certain representative patterns for training purpose (e.g., which may be written to and read from different parts of the non-transitory storage medium). For instance, the foregoing 228,928 samples might be read back from memory for training the ML classifier. Depending on the location of ML detector 366 in the read channel, samples out of different components in the read path may be used for training a specific ML classifier. In a further example, a set of known randomized data patterns may be determined and used to train one or more ML classifier(s), and a further set of known randomized data patterns may be used to test the trained classifier(s).

For simplicity, equalized FIR samples (e.g., channel samples collected from the FIR 262 of the storage medium hardware channel) are used in some cases as representative samples in various embodiments herein. However, it should be understood that samples collected from other suitable components (e.g., the ADC, etc.) may also be collected for ML training as described herein.

In some embodiments, to efficiently classify the received samples into binary values with a high enough confidence relative to a threshold during data detection and recovery, different ML classifiers may be trained by the collected samples, based on where the signals are collected from the read path. For instance, in an example using FIR samples, it may be desirable for the samples to fall into a different groups/clusters that have different predetermined values. For example, it may be desirable for the FIR samples to have values of substantially +16, −16, +48, and −48, although it should be understood that actual measured FIR values may deviate from these four values due to noise and/or distortion. The ML classifiers can evaluate incoming samples, including noisy samples, relative to these values and classify them.

The ML classifier(s) may comprise any suitable machine learning algorithm capable of performing the acts and functionality described herein. In some embodiments, a machine learning algorithm may include k-nearest neighbors (kNN), support vector machine (SVM), density-based spatial clustering of applications with noise (DBSCAN), etc. As a further example, ML algorithms from the Scikit-learn library for the Python programming language may be trained and used to analyze data samples. For simplicity, two ML algorithms kNN and SVM (may also be referred as kNN classifier and SVM classifier) are mainly used as representative classifiers for remaining discussions in the present disclosure. However, it is to be understood that the disclosed ML detector is not limited to these two ML algorithms, and that other ML algorithms may be trained and used for data classification and detection. In some embodiments, the confidences determined by the ML classifier(s) may be compared to a threshold value to detect the output values of the corresponding samples. The threshold may be a hyperparameter that may be set in some cases.

In block 404, the FIR samples may be transformed into feature vectors. In an embodiment using FIR samples, the feature vectors may be constructed as comprising a stretch of FIR samples with a certain length. For instance, the stretch length for the constructed feature vectors may be 7, 9, 11, 13, 15, etc., although it should be understood that the foregoing vectors are provided by way of example and that other variations are also applicable.

In some embodiments, the accuracy of an ML detector 366 can vary based on how input objects are represented. Input objects for an ML detector 366 may be transformed into feature vectors, which contain a number of features that are descriptive of the objects. The number of features may be tuned for accuracy. For example, feature vectors that are overly large can be too computationally expensive and/or difficult to process because of their excess dimensionality, and feature vectors that are overly small may not contain sufficient information for the ML detector 366 to accurately predict the output.

In some embodiments, the feature length may coincide with a length used by an upstream data filter, such as the FIR filter. For example, if the FIR filter uses a length of 10 samples to counter effects of inter-symbol interference, the ML detector 366 may be configured to detect the value of a sample in the center of a sequence of samples at least 10 samples long, which comprise the feature vector. For example, the length of the feature vector may vary from 70%-200% (or more) of the length used by the upstream filter, although other ranges are also possible and contemplated.

In some embodiments, the length of the samples of the ADC 260 or other upstream components may be used to determine the length of the feature vectors.

In some embodiments, the feature vector length used by an ML detector 366 may be predetermined based on the training data and/or characteristics of the hardware components of a device that incorporates the ML detector 366. In some instances, the feature vector length may comprise a hyperparameter of ML algorithm comprising the ML detector 366.

Block 406 depicts example feature vectors and the corresponding labels (expected outputs) generated in block 404 for use in training and/or testing one or more ML detectors 366. As discussed earlier, in one embodiment, the constructed feature vectors may include stretches of 7 FIR samples, as shown by the column X[i] in the block 406 in FIG. 4. The corresponding labels y[i] for these feature vectors may correspond to the bit value corresponding to the center FIR sample of each stretch of the 7 FIR samples. For instance, for a feature vector: X[i−3], X[i−2], X[i−1], X[i], X[i+1], X[i+2], X[i+3], its corresponding label is y[i].

In block 408, the generated feature vectors and their corresponding labels may be used to train the classifier(s) of the ML detector 366. During the training process, the available samples might be divided into two sets of data (e.g., a training set and a testing set). For example, each set may have a certain number of samples (e.g., 110,000 samples assigned for each set from a total of 228,922 samples).

The training set may be used to train the ML detector 366 and the test set may be used to test the trained ML detector 366. In some embodiments, one or more control parameters of a given ML classifier of the ML detector 366 may be preconfigured and/or manually adjusted by optimizing performance based on a subset (e.g., validation set) of the training set, or via cross-validation. Once trained, the trained ML detector 366 may evaluate bit error rate performance, as further described elsewhere herein.

Figure 5:
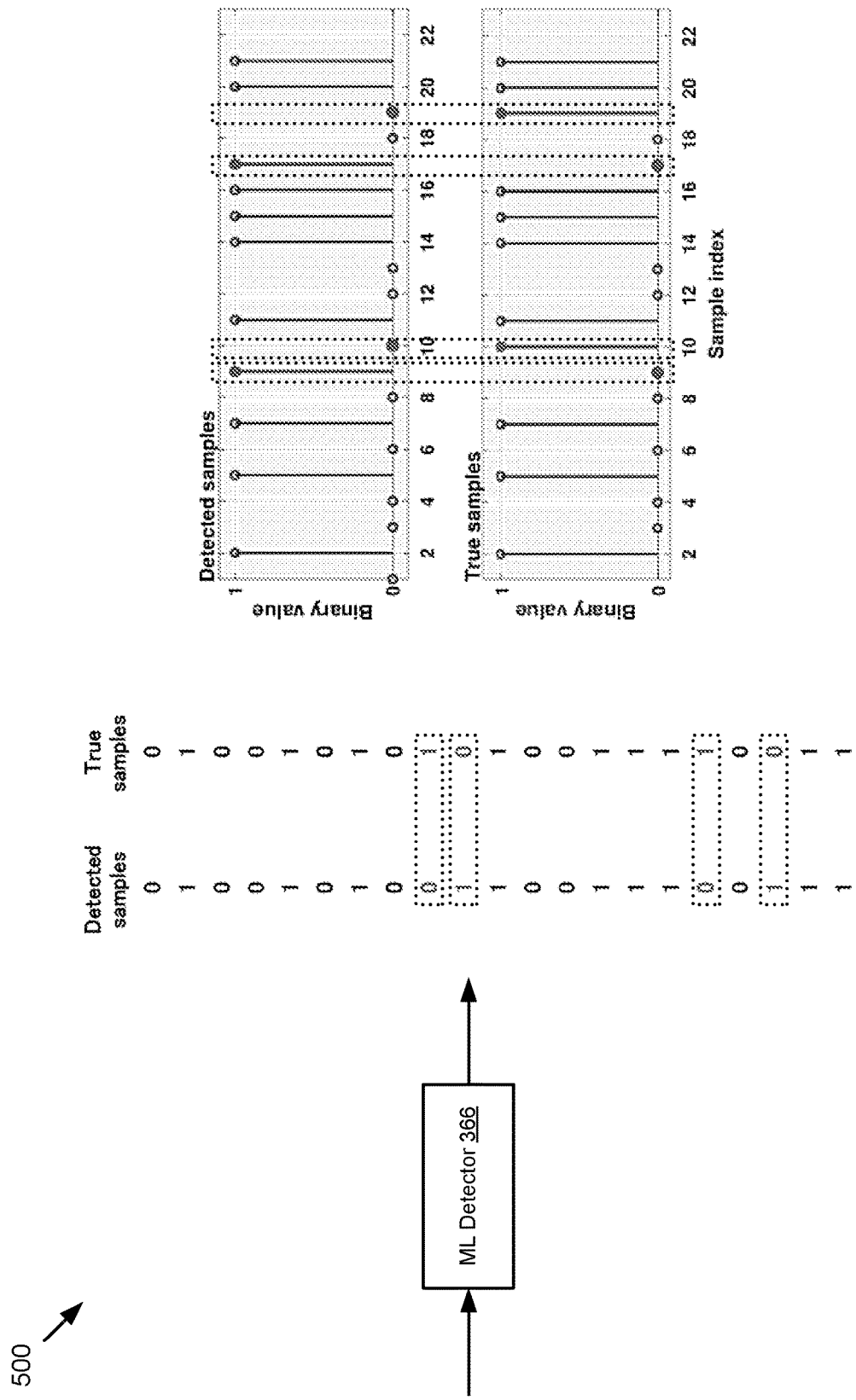
FIG. 5 is a flowchart of an example method for detecting error events.

FIG. 5 is a flowchart of an example method 500 for detecting error events by an ML detector 366. As illustrated, the samples may be fed into a trained ML detector 366, and the ML detector 366 may process the samples based on their values. The resulting outputs, the detected samples, may then be compared to true samples, which are samples with known values when they are written into non-transitory memory. FIG. 5 shows an example error rate performance of a trained ML detector 366. In the figure, the error events are provided in tabular (left) and graphical (right) forms. In the illustrated example, four bits are detected as errors (incorrectly detected as "0" instead of "1" or vice versa), as shown by the dashed lines illustrated in FIG. 5. It should be noted processing depicted in FIG. 5 is provided by way of example, and the actual error rate performance of an ML detector 366 may vary.

FIGS. 6A-6H depict graphical visualizations showing various advantages of ML-based data processing. The error rate in the figures is determined by dividing the (log) ratio of the number of samples found to be in error by the total number of bits detected.

Figure 6C:
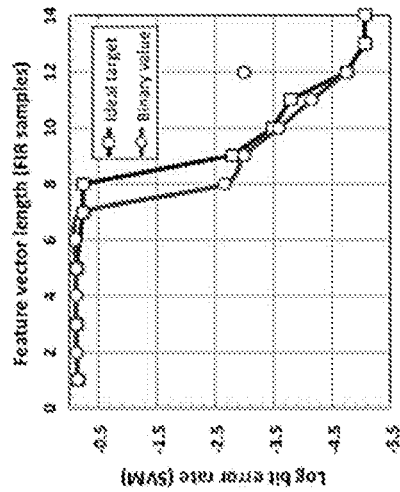
FIGS. 6A-6H are graphical visualizations showing various advantages of ML-based data processing.
Figure 6D:
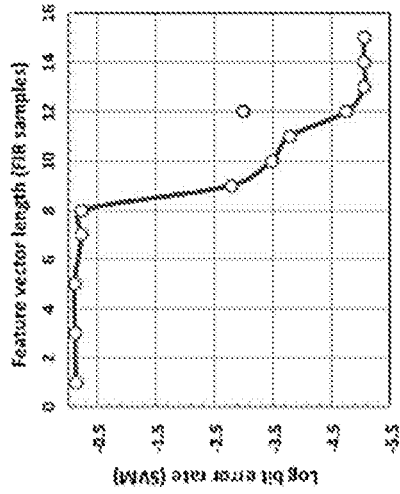
Figure 6A:
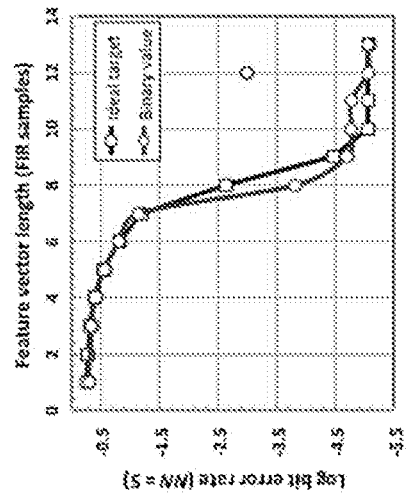
Figure 6B:
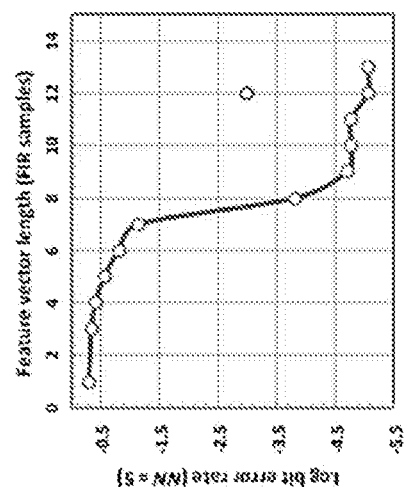

FIGS. 6A and 6B depict graphs 600 and 602 show bit error rates of the testing set as a function of the feature vector length. As shown, the bit error rate rapidly drops when the FIR feature vector length is greater than 7 samples for the kNN classifier and greater than 8 samples for the SVM classifier, respectively. It can also be seen that the error rate performance saturates when the feature vector length is approximately 12 samples or longer.

In some embodiments, the channel samples used in the measurements may be acquired from the channel chip. The open black circles in FIG. 6A shows the average SOVA bit error rate measured by the hardware channel. As illustrated, the measured (log) SOVA bit error rate for these same samples is approximately −3.0. The detection scheme used by ML detector (e.g., kNN classifier, SVM classifier, etc.) clearly yields a significant improvement over the SOVA-based hardware classification.

For the results shown in FIG. 6A, the binary values of the FIR samples ("0" or a "1") are used as the training labels for the respective ML classifiers. Since the ideal FIR values (that is, +16, −16, +48, or −48) for the data patterns can be readily determined, the ideal FIR values (that is, +16, −16, +48, or −48, instead of "0" or "1") could also be used as training labels for training the ML classifiers. This is shown in at least FIG. 6B. Other variations are also possible and contemplated.

FIGS. 6C and 6D depict graphs 610 and 612 showing a bit error rate for the kNN and SVM classifiers, respectively. As can be seen, performance between the two classifiers is comparable. The variation between the two classifiers is accounted for due to the input binary and ideal target values not being the same.

In FIGS. 6A-6D, the FIR filter in the hardware channel has a length of 10 samples. This helps the FIR filter to counter the effects of inter-symbol interference. The bit error rate may be reduced when a vector length corresponds with the sample length of the FIR filter (e.g., detecting the value of a bit in the center of a sequence 10 samples long).

Figure 6G:
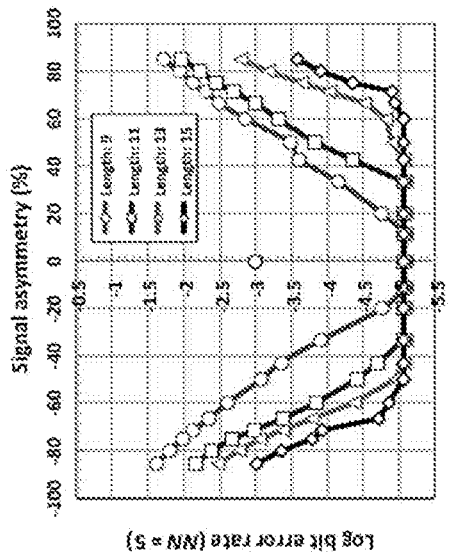
Figure 6H:
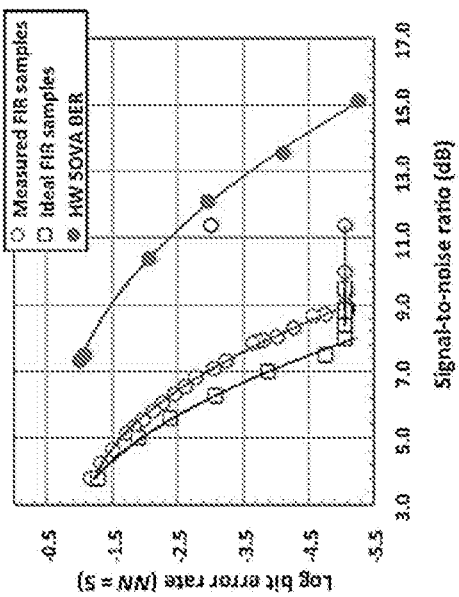
Figure 6E:
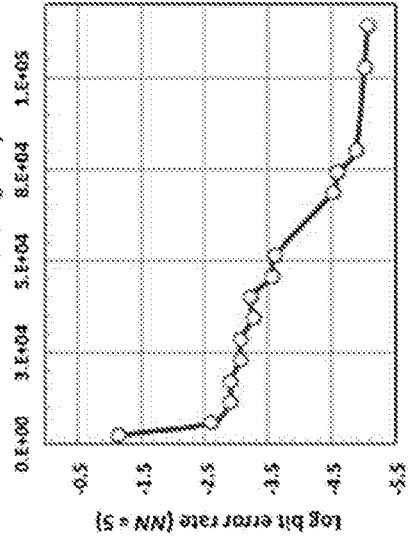
Figure 6F:
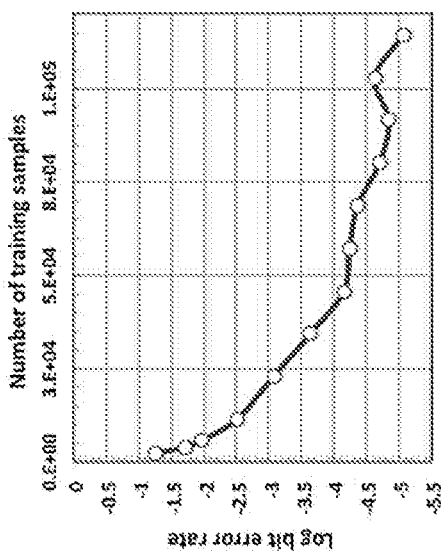

FIGS. 6E and 6F depict graphs 620 and 622 showing the number of training samples used to train the kNN and SVM classifiers (respectively) when the feature vector length is 12 FIR samples. The results show that, in these examples, using about 100,000 samples to train the two classifiers allows one to achieve the lowest/best (log) error rate (e.g., of approximately −5.0. in this case).

As previously discussed, an example of an ideal read channel in an HDD embodiment may be one that is linear and dominated by AWGN. If the read-back signal from the head of the HDD is asymmetric, there is circuitry in the channel analog front end that can be used to linearize the read-back signal. However, asymmetry correction is limited, and if the signal asymmetry is extremely high, complete asymmetry correction may result in noise enhancement and degrade bit error rate performance. The degree of correction will be a trade-off between signal linearization and bit error rate degradation (noise enhancement). Since the ML technology-based data detection proposed in this disclosure is not necessarily premised on signal linearity, the ML technology-based data detection may perform well even if the read-back samples are asymmetric.

To determine the robustness of the ML classifiers in the presence of signal asymmetry, an asymmetry is mathematically applied to the already measured FIR samples, which are then used to retrain and retest the kNN classifier as a function of the signal asymmetry. Equation (1) gives the asymmetry definition, where $Sig._{pos}$ is the maximum positive FIR sample value and $Sig._{ng}$ is the minimum negative FIR sample value:

$$Asym.(\%) \equiv 100 \times \frac{Sig._{pos} - |Sig._{neg}|}{Sig._{pos} + |Sig._{neg}|}$$

Example testing results are shown in the graph 630 depicted in FIG. 6G, in which the y label used for training is the FIR sample binary values, and the FIR feature vector lengths are varied (e.g., 9, 11, 13, and 15). From the figure, it can be seen that when the feature vector length is on the order of 13 samples, the ML detection scheme performance is immune to signal asymmetry values as high as 50%. This indicates the kNN ML detector can beneficially provide enhanced detection even when the read-back signal is highly non-linear and strongly distorted.

Signal asymmetry and/or nonlinearities are not the only performance detractors in data recovery. Noise can be another key impairment. To assess the performance of the ML detector 366 in dealing with samples with noise, random noise can be intentionally added to the measured and ideal samples. For example, when using a kNN ML classifier, the kNN ML classifier may be retrained and retested.

FIG. 6H depicts graph 640 showing the bit error rate of the kNN ML classifier as a function of SNR ratio. The open circles and the open squares connected by lines denote the bit error rates of the measured and ideal FIR samples with the added noise, respectively. The filled circles connected by a line denote the bit error rate of the hardware SOVA detector. The feature vector length for training the kNN ML algorithm is 15 FIR samples. From the figure, it can be seen that the kNN ML detector has the same bit error rate (BER) as the SOVA detector at a significantly lower SNR. The general BER behavior of the kNN ML detector as SNR decreases is similar to that of the SOVA detector. When noise is high enough, all detectors may eventually fail, but the kNN ML detector shows an improved performance and higher noise immunity than a conventional SOVA detector. Furthermore, this benefit comes with reduced complexity, since unlike the SOVA BER measurement, the kNN ML detector does not necessarily require the use of noise whitening filters or the Viterbi-like detector.

Technology for improved read channel data detection using ML algorithms is described above. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to particular hardware.

Reference in the specification to "one embodiment" or "an embodiment" means that a particular feature, structure, or characteristic described in connection with the embodiment is included in at least one embodiment or implementation of the disclosed technologies. The appearances of the phrase "in one embodiment" in various places in the specification are not necessarily all referring to the same embodiment or implementation.

Some portions of the detailed descriptions above may be presented in terms of processes and symbolic representations of operations on data bits within a computer memory. A process can generally be considered a self-consistent sequence of operations leading to a result. The operations may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), erasable programmable read-only memories (EPROMs), electrically erasable programmable read-only memories (EEPROMs), magnetic or optical cards, flash memories including USB keys with non-volatile memory or any type of media suitable for storing electronic instructions, each coupled to a computer system bus.

The disclosed technologies can take the form of an entire hardware implementation, an entire software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The terms storage media, storage device, and data blocks are used interchangeably throughout the present disclosure to refer to the physical media upon which the data is stored.

Finally, the processes and displays presented herein may not be inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A read channel circuit, comprising:
   an analog to digital converter (ADC) configured to receive an analog read signal and convert the analog read signal into a plurality of digital samples;
   a machine learning detector coupled to the ADC, the machine learning detector being configured to receive the plurality of digital samples from the ADC and predict to which category, from a plurality of categories, a digital sample from the plurality of digital samples belongs, for at least some of the plurality of digital samples; and
   a decoder configured to decode, based on at least some of the predicted categories, the plurality of digital samples to reveal previously encoded data.

2. The read channel circuit of claim 1, further comprising:
   an electronic finite impulse response (FIR) filter situated between the ADC and the machine learning detector, the FIR filter configured to receive the plurality of digital samples and process the plurality of digital samples for input into the machine learning detector.

3. The read channel circuit of claim 2, wherein feature vectors in a training data set for training the machine learning detector have a feature vector length between 5 and 15 FIR samples.

4. The read channel circuit of claim 1, wherein the machine learning detector is trained using a training data set comprising one of a plurality of electronic finite impulse response samples and a plurality of ADC samples.

5. The read channel circuit of claim 1, wherein the machine learning detector comprises one of a K-nearest neighbors algorithm and a support vector machine model.

6. The read channel circuit of claim 1, wherein the machine learning detector comprises a plurality of detectors that are configured to process each digital sample independently in parallel, each detector from the plurality of detectors being configured to output a probability value for each digital sample reflecting a probability of that digital sample belonging to a category.

7. The read channel circuit of claim 6, further comprising:
   a comparator configured to receive the probability value output by each detector from the plurality of detectors for each digital sample, and select a final probability for each digital sample based on the probability value output from each detector for that digital sample.

8. The read channel circuit of claim 6, wherein the probability value is a value between 0 and 1.

9. The read channel circuit of claim 1, further comprising:
   a variable gain amplifier (VGA) configured to control a signal level of the analog read signal based on a gain determined by an automatic gain control loop; and
   a continuous time filter (CTF) configured to limit signal bandwidth.

10. A reception circuit of a transceiver, comprising:
    an analog to digital converter (ADC) configured to receive an analog input signal and convert the analog input signal into a plurality of digital samples;
    a machine learning detector coupled to the ADC, the machine learning detector being configured to receive the plurality of digital samples from the ADC and predict to which category, from a plurality of categories, a digital sample from the plurality of digital samples belongs, for at least some of the plurality of digital samples; and
    a decoder configured to decode, based on at least some of the predicted categories, the plurality of digital samples to reveal previously encoded data.

11. A data storage device comprising:
    a non-transitory storage medium; and
    control circuitry configured to:
       receive an input signal comprising data read from the non-transitory storage medium, the input signal including a non-linear and distorted waveform;

process the input signal into a plurality of digital samples;

classify, using a machine learning algorithm, a digital sample from the plurality of digital samples into a category from a plurality of categories for at least some of the plurality of digital samples;

decode the plurality of digital samples based on at least some of the plurality of categories; and descramble the decoded plurality of digital samples to reveal the data read from non-transitory storage medium.

12. The data storage device of claim 11, wherein the control circuitry is further configured to:

filter the plurality of digital samples to match a signal characteristic to a desired target response for classifying at least some of the plurality of digital samples.

13. The data storage device of claim 12, wherein feature vectors in a training data set for training the machine learning algorithm have a feature vector length between 5 and 15 filtered digital samples.

14. The data storage device of claim 11, wherein the machine learning algorithm is trained using a training data set comprising one of and the plurality of digital samples and a plurality of filtered digital samples.

15. The data storage device of claim 11, wherein the machine learning algorithm comprises one of a K-nearest neighbors algorithm and a support vector machine model.

16. The data storage device of claim 11, wherein the machine learning algorithm comprises a plurality of algorithms that process the digital sample independently in parallel, each of the algorithms outputting a probability value for the digital sample.

17. The data storage device of claim 16, wherein the control circuitry is further configured to:

receive the probability value output for each digital sample by each algorithm from the plurality of algorithms and select a final probability for each digital sample based on the probability value for that digital sample output by each algorithm from the plurality of algorithms.

18. The data storage device of claim 16, the probability value is a value between 0 and 1.

19. The data storage device of claim 11, wherein the control circuitry is further configured to:

control a signal level of the input signal based on a gain determined by an automatic gain control loop; and limit signal bandwidth.

20. A method comprising:

receiving an analog read signal comprising data read from a non-transitory storage medium of a non-transitory data storage device;

processing the analog read signal into a plurality of digital samples;

classifying, using a machine learning algorithm, a digital sample from the plurality of digital samples into a category from a plurality of categories for at least some of the plurality of digital samples; and decoding, based on at least some of the plurality of categories, the plurality of digital samples to reveal previously encoded data.

21. A method comprising:

receiving a data transmission as an input signal;

processing the input signal into a plurality of digital samples;

classifying, using a machine learning algorithm, a digital sample from the plurality of digital samples into a category from a plurality of categories for at least some of the plurality of digital samples; and decoding, based on at least some of the plurality of categories, the plurality of digital samples to reveal previously encoded data.

22. A read channel circuit, comprising:

an analog to digital converter (ADC) configured to receive an analog read signal and convert the analog read signal into a plurality of digital samples;

a machine learning detector coupled to the ADC, the machine learning detector being configured to receive the plurality of digital samples from the ADC and predict to which category, from a plurality of categories, a digital sample from the plurality of digital samples belongs, for at least some of the plurality of digital samples;

an electronic finite impulse response (FIR) filter situated between the ADC and the machine learning detector, the FIR filter configured to receive the plurality of digital samples and process the plurality of digital samples for input into the machine learning detector; and a decoder configured to decode the plurality of digital samples based on at least some of the predicted categories.

23. A read channel circuit, comprising:

an analog to digital converter (ADC) configured to receive an analog read signal and convert the analog read signal into a plurality of digital samples;

a machine learning detector coupled to the ADC, wherein:

the machine learning detector is configured to receive the plurality of digital samples from the ADC and predict to which category, from a plurality of categories, a digital sample from the plurality of digital samples belongs, for at least some of the plurality of digital samples;

the machine learning detector comprises a plurality of detectors that are configured to process each digital sample independently in parallel; and each detector from the plurality of detectors is configured to output a probability value for each digital sample reflecting a probability of that digital sample belonging to a category; and a decoder configured to decode the plurality of digital samples based on at least some of the predicted categories.

* * * * *